United States Patent [19]

Nishikawa et al.

[11] Patent Number: 4,584,908
[45] Date of Patent: Apr. 29, 1986

[54] CREEP PREVENTION APPARATUS FOR CAR EQUIPPED WITH AUTOMATIC TRANSMISSION

[75] Inventors: Masao Nishikawa, Tokyo; Yoshimi Sakurai, Tanashi; Takashi Aoki, Fujimi, all of Japan

[73] Assignee: Honda Giken Kogyo Kabushiki Kaisha, Tokyo, Japan

[21] Appl. No.: 593,997

[22] Filed: Mar. 27, 1984

[30] Foreign Application Priority Data

Mar. 28, 1983 [JP] Japan .................... 58-52030

[51] Int. Cl.$^4$ ................. B60K 41/18; B60K 41/16
[52] U.S. Cl. ........................ 74/866; 74/867
[58] Field of Search ............ 74/869, 868, 867, 866

[56] References Cited

U.S. PATENT DOCUMENTS 3,890,856 6/1975 Miyauchi et al. ............... 74/869
4,313,353 2/1982 Honig ........................ 74/867 X
4,494,640 1/1985 Honig ........................ 74/868 X
4,503,733 3/1985 Hasegawa ..................... 74/866 X
4,513,638 4/1985 Nishikawa et al. ............. 74/866
4,513,639 4/1985 Hiramatsu .................... 74/866

FOREIGN PATENT DOCUMENTS 3019274 11/1981 Fed. Rep. of Germany ........ 74/866
0063046 5/1980 Japan ....................... 74/866

Primary Examiner—George H. Krizmanich
Attorney, Agent, or Firm—Armstrong, Nikaido, Marmelstein & Kubovcik

[57] ABSTRACT

In an automatic transmission which prevents creep in advance speed change gear trains and which makes it possible to apply engine brake in the advance speed change gear trains, the invention provides a creep prevention apparatus for a car equipped with an automatic transmission which ensures effective engine brake even if control elements for the creep prevention mechanism are out of order by accident.

2 Claims, 3 Drawing Figures

CREEP PREVENTION APPARATUS FOR CAR EQUIPPED WITH AUTOMATIC TRANSMISSION

BACKGROUND OF THE INVENTION

The present invention relates to a creep prevention apparatus for a car equipped with an automatic transmission.

If a transmission lever is kept set to a drive position (advance position) during the stop of a car equipped with an automatic transmission, the dragging torque of a torque convertor causes so-called "creep phenomenon" in which the car moves forward against the will of a driver of the car. Since this creep force applies a braking force to the engine which is idling, a throttle opening must be kept open to such a level as to compensate for this braking force, in order to keep the number of revolution of the engine at a reference value. For this reason, fuel consumption becomes naturally greater as much. This is one of the main reasons why the car equipped with an automatic transmission has high fuel consumption.

The assignee of the present invention proposed previously an improved apparatus in which the pressure of an advance clutch is bypassed to an oil tank upon detecting the idling of a car so that the power transmission between the engine and driving wheels is cut off and the load to the engine is made to the same level as that of a car equipped with a manual transmission. However, the following problem will occur in an automatic transmission in which speed change gear trains (e.g. a first speed gear train) at the time of idling are also used at the time of engine brake. Although the prior art apparatus does not cause any problem at all so long as all the systems operate normally, the engine brake at the first speed gear train is hardly effective if the systems are kept under the creep prevention state for some reason or other. In a car of the type in which a shift position is provided so as to make the engine brake effective at this first speed gear train, therefore, the driver of the car necessarily relies upon a foot brake.

The possible cases in which the problem described above occurs are as follows. The first is the case in which a sensor system is out of order and judges the normal operation as idling. The second possible case is that an actuator unit is out of order and keeps the creep prevention state, although the sensor system and the judgement system are normal. Among the second case, it is highly likely that the operation of an oil pressure change-over valve as the final actuator becomes unsmooth due to any dust mixed in the oil, and the change-over valve can not return to the inoperative position if the force of a return spring is weak.

The problem of the kind described above does not occur in a car in which the shift position to make the engine brake effective at the first speed gear train is not provided. In a car of the type in which the engine brake is applied at the second speed gear train, however, the gear ratio of the second speed gear train can not be reduced freely in order to secure sufficient brake performance, and this becomes a critical problem in improving the fuel consumption.

SUMMARY OF THE INVENTION

To eliminate the problem of the prior art described above, in an automatic transmission which prevents creep in advance gear trains and which makes it possible to apply engine brake in the speed change gear trains, the present invention is directed to provide a creep prevention apparatus for a car equipped with an automatic transmission which ensures effective engine brake even if the creep prevention mechanism is out of order by accident.

BRIEF DESCRIPTION OF THE DRAWINGS

The accompanying drawings illustrate one preferred embodiment of the present invention, in which.

DESCRIPTION OF THE PREFERRED EMBODIMENT

Hereinafter, one preferred embodiment of the present invention will be described with reference to the accompanying drawings.

Figure 1:
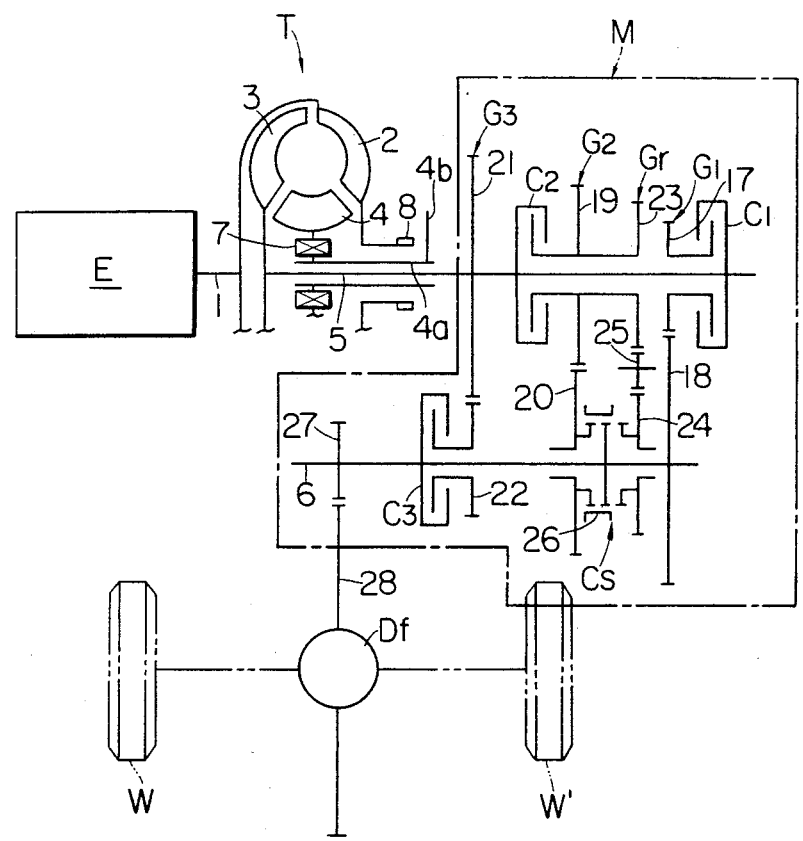
FIG. 1 is a block diagram showing the outline of an automatic transmission for a car of a 3-stage advance and 1-stage reverse type to which the present invention is applied.

Referring to FIG. 1 of the drawing which depicts the outline of an automatic transmission for a car of a 3-stage advance and 1-stage reverse type, the output of an engine E is transmitted to driving wheels W, W' from a crank shaft 1 sequentially through a torque convertor T, an auxiliary transmission M, and a differential device Df, and drives these driving wheels W, W'.

The torque convertor T consists of a pump vane wheel 2 interconnected to the crank shaft 1, a turbine vane wheel 3 interconnected to the input shaft 5 of the auxiliary transmission M, and a stator vane wheel 4 interconnected to a stator shaft 4a, which is supported on the input shaft 5 so as to be capable of relative rotation, via a one-way clutch 7. The torque transmitted from the crank shaft 1 to the pump vane wheel 2 is fluid-dynamically transmitted to the turbine vane wheel 3, and when the torque is amplified between them, the stator vane wheel 4 bears its reaction, as is well known in the art.

Figure 2:
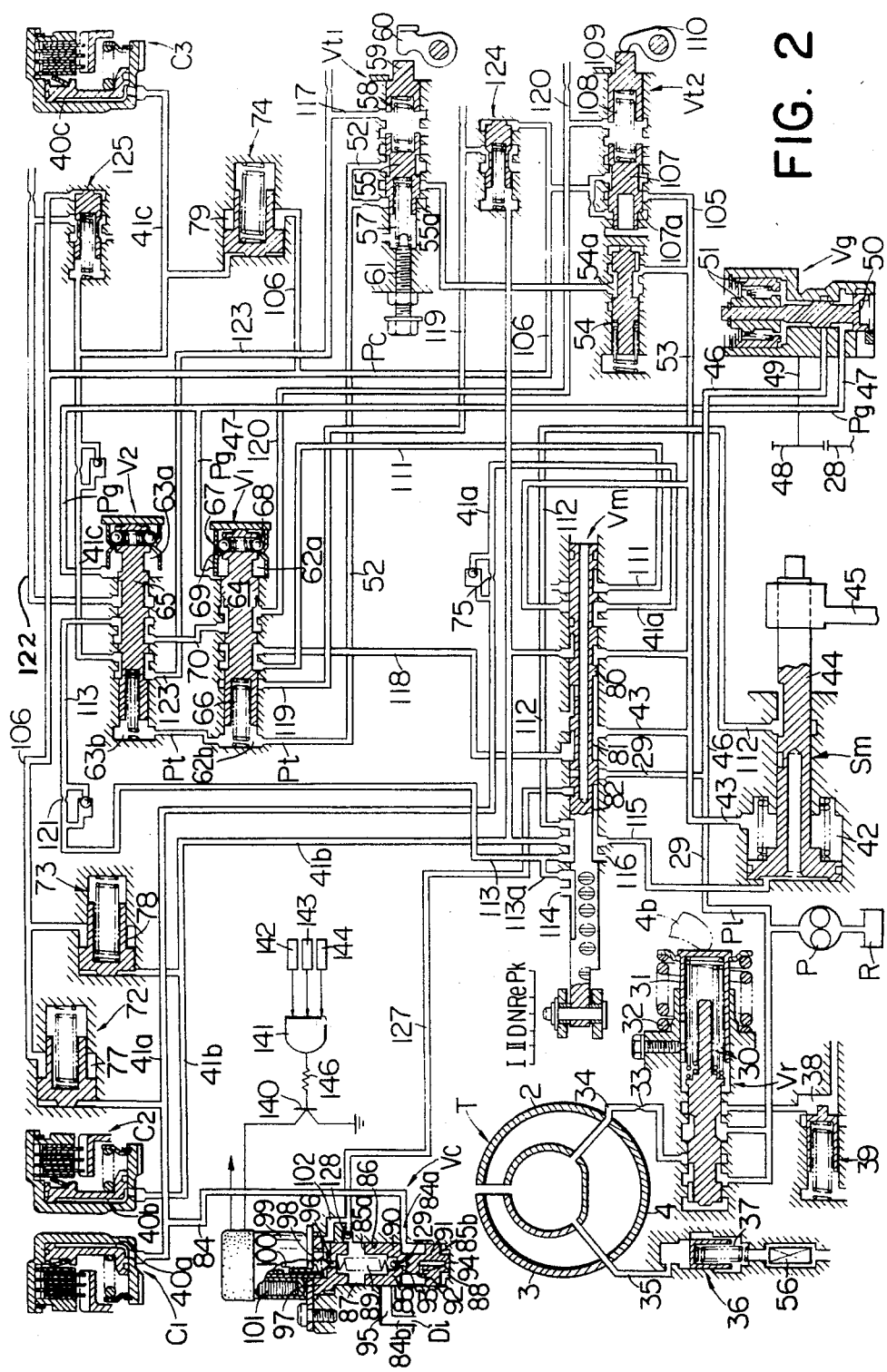
FIG. 2 is its oil pressure control circuit diagram.

A pump driving gear 8 is disposed at the right end of the pump vane wheel 2 and drives an oil pressure pump P shown in FIG. 2, and a stator arm 4b is fixedly disposed at the right end of the stator shaft 4a and controls a regulator valve Vr shown in FIG. 2.

A first speed gear train $G_1$, a second speed gear train $G_2$, a third speed gear train $G_3$ and a reverse gear train Gr are juxtaposed with one another between input and output shafts 5, 6 of the auxiliary transmission M that are parallel to each other. The first speed gear train $G_1$ consists of a driving gear 17 which is interconnected to the input shaft 5 via a first speed clutch $C_1$ as a frictional engagement element for advance, and a driven gear 18 that is fixedly disposed on the output shaft 6 and meshes with the driving gear 17. The second gear train $G_2$ consists of a driving gear 19 interconnected to the input shaft 5 via a second speed clutch $C_2$, and a driven gear 20 that is interconnected to the output shaft 6 via a change-over clutch Cs and meshes with the driving gear 19. The third speed gear train $G_3$ consists of a driving gear 21 fixedly disposed on the input shaft 5 and a driven gear 22 interconnected to the output shaft 6 via a third speed clutch $C_3$. The reverse gear train Gr consists of a driving gear 23 that is formed integrally with the driving gear 19 of the second speed gear train $G_2$, a driven gear 24 interconnected to the output shaft 6 via the change-over clutch Cs, and an idle gear 25 that meshes with both gears 23 and 24.

The change-over clutch Cs is disposed at the intermediate position between the driven gears 20 and 24 described above, and when the selector sleeve 26 of this clutch Cs is shifted to the advance position on the left side in the drawing or to the reverse position on the right side in the drawing, the driven gears 20 and 24 can be selectively interconnected to the output shaft 6.

When the selector sleeve 26 is held at the advance position as depicted in the drawing and only the first speed clutch $C_1$ is connected, the driving gear 17 is interconnected to the input shaft 5 to establish the first speed gear train $G_1$, and the torque is transmitted from the input shaft 5 to the output shaft 6 through this gear train $G_1$. Next, when the second speed clutch $C_2$ is connected with the first speed clutch $C_1$ being kept cut off, the driving gear 19 is interconnected to the input shaft 5 to establish the second speed gear train $G_2$, and the torque is transmitted from the input shaft 5 to the output shaft 6 through this gear train $G_2$. When both first and second speed clutches $C_1$ and $C_2$ are cut off and the third speed clutch $C_3$ is connected, the driven gear 22 is interconnected to the output shaft 6 to establish the third speed gear train $G_3$, and the torque is transmitted from the input shaft 5 to the output shaft 6 through this gear train $G_3$.

Next, when only the second speed clutch $C_2$ is connected after the selector sleeve 26 is changed over to the reverse position on the right side of the drawing, the driving gear 23 is interconnected to the input shaft 5 and the driven gear 24 to the output shaft 6, thereby establishing the reverse gear train Gr. Hence, the torque is transmitted from the input shaft 5 to the output shaft 6 through this gear train Gr.

The torque thus transmitted to the output shaft 6 is transmitted from an output gear 27, disposed at the end of the output shaft 6, to a large diameter gear 28 of the differential device Df.

Referring to FIG. 2, the oil pressure pump P sucks the oil from an oil tank R and pressure-feeds it to an operation oil passage 29. After being regulated to a predetermined pressure by a regulator valve Vr, this pressure oil is sent to a manual valve Vm as manual change-over means. This oil pressure is called a line pressure Pl.

The regulator valve Vr includes a pressure governing spring 30 and a spring receiving cylinder 31 that supports the outer end of the spring 30 and can move to the right and left so as to adjust the set load of this pressure governing spring 30. The stator arm 4b described earlier is in contact with the outer side surface of this spring receiving cylinder 31 in such a manner as to apply the reaction acting upon the stator vane wheel 4, that is, the stator reaction. A stator spring 32 for bearing the stator reaction is connected to the spring receiving cylinder 31. When the stator reaction increases, therefore, the stator spring 32 is compressed so that the spring receiving cylinder 31 moves to the left and increases the set load to the pressure governing spring 30. As a result, the line pressure Pl of the operation oil passage 29 is increased.

A part of the pressure oil whose pressure is regulated by the regulator valve Vr is introduced into the torque convertor T through an inlet oil passage 34 having a throttle 33, and applies the pressure in order to prevent cavitation. The internal pressure of the torque convertor is determined by the size of the throttle 33, the force of a spring 37 of a check valve 36 disposed in an outlet oil passage 35 of the torque convertor T, and the like.

After passing through the check valve 36, the oil is returned to the oil tank R through an oil cooler 56.

The excess of the pressure oil discharged from the oil pressure pump P is introduced into a lubricant passage 38 by the regulator valve Vr and is sent to each lubricating portion. The pressure governing valve 39 is connected to the lubricant passage 38 in order to secure the minimum necessary oil pressure.

When the manual valve Vm is at the neutral position as shown in the drawing, the oil pressure sent to this valve Vm is not sent to any of the clutches $C_1$, $C_2$, $C_3$ nor to other various oil pressure operating portions. Accordingly, all of the three clutches $C_1$–$C_3$ are under the disengaged state, and hence the torque of the engine E is not transmitted to the driving wheels W, W'.

When the manual valve Vm is moved to the left by one stage from the position N shown in the drawing and is thus shifted to the drive position D, the operation oil passage 29 from the oil pressure pump P is communicated with oil passages 43 and 118, while another oil passage 111 is communicated with the oil pressure cylinder 40a of the first speed clutch $C_1$ through an operation oil passage 41a equipped with a unidirectional throttle 75 interposed therein. An oil passage 112 is cut off from the operation oil passage 41b communicated with the oil pressure cylinder 40b, and an oil passage 113a is also cut off from an exhaust port 114. An oil passage 115 is kept communicated with the exhaust port 116. Since the operation oil passage 43 is communicated with a spring chamber 42 of an oil pressure servo motor Sm for shifting the selector sleeve 26, the piston 44 of the servo motor Sm remains at the left operation position shown in the drawing and holds the selector sleeve 26 via the shift fork 45 at the advance position shown in FIG. 1. Accordingly, the reverse gear train Gr is kept inoperative.

An input oil passage 46 communicated with the input port of the governor valve Vg branches from the operation oil passage 29, while a first signal oil passage 47 extends from the output port of this valve Vg.

The governor valve Vg is of a heretofore known type, and is rotated around a rotary shaft 49 of its own by a gear 48 meshing with the large diameter gear 28 of the differential device Df. Accordingly, the speed of its rotation is proportional to the car speed, and the governor valve Vg can produce an oil pressure proportional to the car speed by the action of the centrifugal force acting upon the weight 51 of its spool valve body 50, that is, the governor pressure Pg, to the first signal oil passage 47.

An oil passage 53 branches from the operation oil passage 43, and is communicated with a first throttle valve $Vt_1$ via a modulator valve 54. The modulator valve 54 is a reducing valve which is urged to the closing side by the spring force and by the modulator pressure of the output port 54a, and limits the upper limit value of the inlet pressure of the first throttle valve $Vt_1$.

The first throttle valve $Vt_1$ is of a heretofore known type, and includes a spool valve body 55, a control spring 58 that urges the valve body 55 to the left, a return spring 57 that pushes the valve body 55 to the right, a control piston 59 that supports the outer end of the control spring 58, a control cam 60 that rotates in the interlocking arrangement with the increase of opening of the throttle valve of the engine E, an adjusting bolt 61 capable of adjusting the set load to the return spring 57, and so forth. When the control piston 59 moves to the left, its displacement is transmitted to the spool valve body 55 via the control spring 58, and pushes it to the left. In response to this leftward movement, the oil pressure, that is generated to the second signal oil passage 52, acts upon a left shoulder 55a of the spool valve body 55 in such a fashion that the oil pressure pushes back the spool valve body 55 to the right. After all, the first throttle valve $Vt_1$ produces the oil pressure proportional to the opening of the throttle valve of the engine E, that is, the throttle pressure Pt, to the second signal oil passage 52. Incidentally, the rotation of the control cam 60 in the counter-clockwise direction continuously narrows the communication between the oil passage 117 and the oil tank R.

The first and second signal oil passages 47 and 52 are communicated with pilot oil pressure chambers 62a, 62b; 63a, 63b at both ends of first-second speed shift valve $V_1$ and second-third speed shift valve $V_2$, respectively. Accordingly, each spool valve body 64, 65 of each shift valve $V_1$, $V_2$ receives the governor pressure Pg and the throttle pressure Pt on its both surfaces and is operated in the following manner.

At first, the spool valve body 64 of the first-second speed shift valve $V_1$ remains at the right position in the drawing due to the force of the spring 66, and the oil passage 118 is communicated with the operation oil passage 41a via the oil passage 111, thereby applying the pressure to the first speed clutch $C_1$ for engagement. Next, as the car speed increases to increase the governor pressure Pg and when the force of the leftward movement of the spool valve body 64 due to this governor pressure Pg overcomes the throttle pressure Pt and the force of the right-ward movement of the valve body 64 due to the spring 66, a click ball 68 which moves together with the valve body 64 inside a click motion mechanism 67 disposed at the extreme right end of the valve body 64 gets over a fixed locating protuberance 69 so that the valve body 64 is rapidly changed over to the leftward movement position. Accordingly, the oil passage 111 is communicated with the drain oil passage 119, and the oil passage 118 with the oil passage 70. The oil passage 70 is cut off from the drain oil passage 120. If the second-third speed shift valve $V_2$ is at the position shown in the drawing under this state, the oil passage 70 is communicated with the oil passage 113 equipped with a unidirectional throttle 121 and further with the operation oil passage 41b via the manual valve Vm. Accordingly, the operation oil is supplied to the oil pressure cylinder 40b, thereby applying the pressure to the second speed clutch $C_2$ for engagement. As a result, the second speed gear train $G_2$ is established.

When the car speed further increases, the same operation as described above also occurs in the second-third speed shift valve $V_2$, and the spool body 65 of this valve $V_2$ is moved to the left due to the increasing governor pressure Pg, thereby communicating the oil passage 113 with the drain oil passage 122 and the oil passage 70 with the operation oil passage 41c which is communicated with the oil pressure cylinder 40c of the third speed clutch $C_3$. Furthermore, the operation oil passage 41c is cut off from the drain oil passage 123. In consequence, the second speed clutch $C_2$ is released from its engagement, while the third speed clutch $C_3$ is pressurized and engaged to establish the third speed gear train $G_3$.

Accumulators 72, 73 and 74 are connected hydraulically parallel to one another with the respective clutches $C_1$, $C_2$ and $C_3$ in order to mitigate any shock that might occur when the speeds are changed. A 1-2 orifice control valve 124 is disposed in the drain oil passage 119, while a 2-3 orifice control valve 125 is disposed in the drain oil passage 122.

The control oil pressure Pc from the second throttle valve $Vt_2$ is led to back chambers 77, 78 and 79 of the accumulators 72, 73 and 74 via an oil passage 106. This second throttle valve $Vt_2$ is interposed between the oil passage 105 branching from the oil passage 53 and the oil passage 106, and includes a spool valve body 107, a control spring 108 moving the valve body 107 to the left, a control piston 109 supporting the outer end of the control spring 108, and a control cam 110 moving the control piston 109 to the left in the interlocking arrangement with the increase of the throttle opening of the engine E. When the control piston 109 moves to the left, its displacement is transmitted to the spool valve body 107 via the control valve 108, and the spool valve body 107 moves to the left. Along with this motion of the valve body 107, the oil pressure produced to the oil passage 106 acts upon a left shoulder 107a of the spool valve body 107 so as to push it back to the right. Due to these operations, the second throttle valve $Vt_2$ applies the control oil pressure Pc proportional to the throttle opening of the engine E to the back pressure chambers 77-79 of the respective accumulators 72-74 through the oil passage 106. Incidentally, the rotation of the control cam 110 in the counter-clockwise direction continuously throttles the communication between the drain oil passage 120 and the oil tank R.

When the speed is reduced, the valve body 65 of the second-third speed shift valve $V_2$ is first moved to the right to attain a speed ratio of the second speed stage from the third speed ratio. When the speed further drops, the valve body 64 of the first-second speed shift valve $V_1$ is moved to the right to attain the first speed ratio. During the speed ratio of the first speed stage at such a driving position D, it is important that the operation oil to be supplied to the first speed clutch $C_1$ is supplied through the unidirectional throttle 75.

The intermediate portion of the operation oil passage 41a is communicated with the accumulator 72, and an oil passage 84 short-circuited to the oil tank R is connected to the intermediate portion of the operation oil passage 41a. A creep prevention valve Vc of a pilot type is interposed at the intermediate portion of this oil passage 84.

The creep prevention valve Vc has a spool valve body 85, which is housed in a cylinder-like valve chamber 86 formed at the intermediate portion of the oil passage 84 so as to divide the oil passage 84 into the upstream and downstream portions 84a and 84b, forming oil chambers 87 and 88 at the upper and lower portions of the valve body 85. A return spring 89 urging downwards the spool valve body 85 is placed in the upper oil chamber 87. The spool valve body 85 is equipped with a pair of upper and lower lands 90, 91, a ring-like groove 92 interposed between the lands, and orifices 93, 94 communicating the groove 92 with the upper and lower oil chambers 87 and 88, respectively. The ring-like groove 92 is always communicated with the upstream portion 84a, and the upper land 90 opens and closes the port 95 to the valve chamber 86 of the downstream portion 84b by its movement in the vertical direction. Preferably, the port 95 is formed in such a manner that its effective open area increases gradually with the movement of the upper land 90 in the upward direction, such as a port having a round cross-sectional shape.

Figure 3:
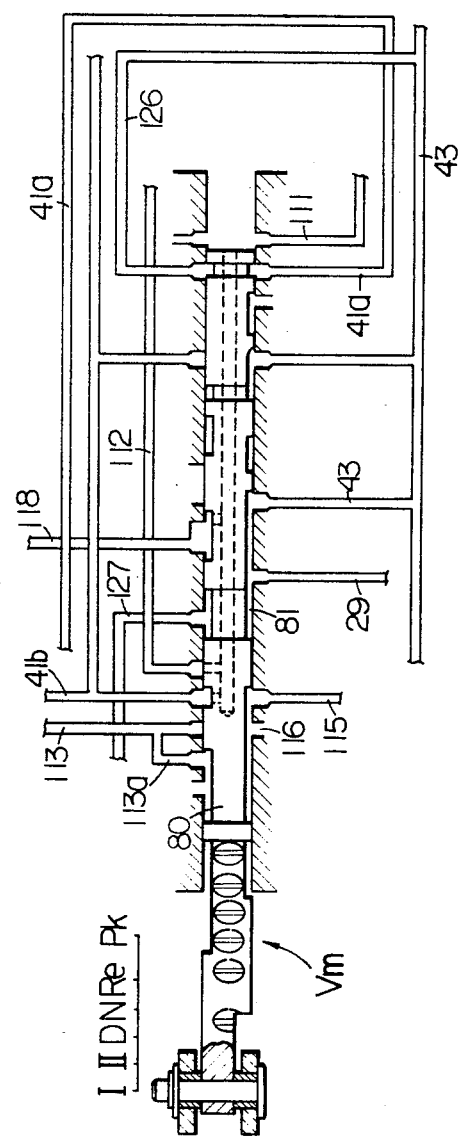
FIG. 3 is a circuit diagram showing the connection of oil passages when a manual valve is shifted to a first speed holding position.

An oil passage 127 is communicated with the upper oil chamber 87 via a check valve 128 which permits the flow of the oil only to the upper oil chamber 87. This oil passage 127 can be communicated with the operation oil passage 29 or with the oil passage 116 communicated with the oil tank R via the manual valve Vm. In other words, when the manual valve Vm is at the neutral position N as shown in FIG. 2 and when it is shifted by one stage to the left to the drive position D, the oil passage 127 is communicated with the oil passage 116 via a groove 82 disposed around the outer circumference of the spool valve body 80 of the manual valve Vm. However, when the manual valve Vm is shifted to the first speed holding position I as shown in FIG. 3, the oil passage 127 is communicated with the operation oil passage 29 communicated with the oil pressure pump P through the groove 81.

A check valve 129 to prevent the back flow of the oil pressure from the upper oil chamber 87 to the lower oil chamber 88 is interposed between the orifice 93 and the upper oil chamber 87, and is held at a suitable position by the end portion of the return spring 89.

An end wall member 97 having an orifice 96 is disposed at the upper end of the valve chamber 86, and an electromagnetic valve 99 having a pilot needle valve 98 for opening and closing the orifice 96 is disposed above the end wall member 97. The needle valve 98 closes the orifice 96 by the force of a spring 100, and opens the orifice 96 when a solenoid 101 is excited. When opened, the orifice 96 is communicated with an oil passage 102 which is branched from a position of the oil passage 127 closer to the manual valve Vm than the check valve 128.

When the solenoid 101 is excited and the orifice 96 is opened, the upper oil chamber 87 is communicated with the oil passage 127 through the orifice 96 and the by-pass oil passage 102, and the oil pressure inside the upper oil chamber 87 drops. For this reason, the spool valve body 85 is moved upward by the force acting upon the pressure-receiving surface 85b that opposes the lower oil chamber 88, and opens the oil passage 84. The pressure of the operation oil passage 41a at this time, that is, the pressure of the first speed clutch $C_1$, is determined by the force of the return spring 89 and by the area of the pressure-receiving surface 85b of the spool valve body 85. If the pressure is set below the pressure of engagement of the first speed clutch $C_1$, therefore, the occurrence of creep can be prevented.

When the valve body 64 of the first-second speed shift valve $V_1$ or the valve body 65 of the second-third speed shift valve $V_2$ moves to the left to establish the speed ratio of the second or third speed stage, the oil pressure inside the operation oil passage 41a is zero, so that the spool valve body 85 does not move upward and the creep prevention valve Vc does not operate, either.

The solenoid 101 of the electromagnetic valve 99 is grounded through a transistor 140, and the output of an AND gate 141 is applied to the base of this transistor 140 through a resistor 146. The following three devices are connected to the input terminal of the AND gate 141: a shift position sensor 142 which produces a high level signal when the shift lever is shifted to the drive position D, a number-of-revolution sensor 143 which detects the number of revolution of the engine E and produces a high level signal when the number of revolution is below a reference value, and a brake sensor 144 which produces a high level signal when a brake pedal is pushed in. When the car is at halt with the brake pedal being pushed by a foot at a crossing, for example, the outputs of all of these sensors 142-144 become the high level signals, and the solenoid 101 is excited to open the creep prevention valve Vc to prevent the occurrence of creep.

The throttle 75 disposed at the intermediate portion of the oil passage 111 plays an important role in preventing the occurrence of creep. Here, the following relation can be established between the diameter d of the throttle 75, the diameter Di of the downstream portion 84b of the oil passage 84 in the creep prevention valve Vc, the discharge pressure Pl of the oil pressure pump P and the oil pressure p in the operation oil passage 41a:

$$\frac{\pi d^2}{4} \sqrt{Pl - p} = \frac{\pi Di^2}{4} \sqrt{p}$$

If Pl=8.5 kg/cm², p=1.0 kg/cm² and d=1.7 mm, Di=2.8 mm. Practically, Di is set to be from 5 to 6 mmφ because other factors are also taken into consideration, but Di does not have a great value so much. To improve the response at the start, the creep prevention valve Vc is disposed as close as possible to the first speed clutch $C_1$.

When the manual valve Vm is shifted to the shift position other than the drive position D, such as an engine brake position which is the first speed holding position I, for example, only the first speed clutch $C_1$ is pressurized and caused to engage. When it is shifted to the second speed holding position II or to the reverse position Re, only the second speed clutch $C_2$ is pressurized and caused to engage, establishing the second speed gear train $G_2$ or the reverse gear train Gr. Particularly when the manual valve Vm is shifted to the reverse position Re, the piston 44 of the servo motor Sm receives the oil pressure on its left end surface, and the spring chamber 42 is communicated with the oil tank R so that the piston 44 moves to the right, thereby establishing the reverse gear train Gr as described above. Incidentally, symbol Pk among the shift positions of the manual valve Vm represents a parking position.

Next, the operation of this embodiment will be described.

It will be now assumed that the car is stopped at a crossing with the brake pedal being pushed by the foot. In this case, since the sensors 142-144 produce the high level signals, the output of the AND gate 141 is at the high level, so that the transistor 40 becomes conductive and the solenoid 101 is excited. The pilot needle valve 98 is lifted in response thereto, and the upper oil chamber 87 is communicated with the oil tank R through the orifice 96, the by-pass oil passage 102, the oil passage 127, the manual valve Vm and the oil passage 116. Accordingly, the pressure of the upper oil chamber 87 drops and the spool valve 85 moves upwards to open the oil passage 84. As a result, the oil pressure of the operation oil passage 41a drops below the engagement pressure of the first speed clutch $C_1$ to prevent the occurrence of creep.

During the driving of the car, however, the pilot needle valve 98 moves downwards and the orifice 96 is closed. The valve body 85 is moved downward by the force of the return spring 89, and the oil passage 84 is closed. Thus, the creep prevention function is released.

Here, it will be assumed that the transistor 140 is internally short-circuited by accident, the solenoid 101 is excited and the pilot needle valve 98 is kept raised. In such a case, since the oil passage 84 is kept opened and the oil pressure supplied to the first speed clutch $C_1$ drops, the engine brake can not be established unless the present invention is employed. In accordance with the present invention, however, when the engine brake is applied by shifting the manual valve Vm to the first speed holding position I shown in FIG. 3, the oil passage 127 is communicated with the operation oil passage 29 and the oil pressure from the oil pressure pump P acts upon the upper oil chamber 87. Accordingly, the oil pressure acting upon the upper pressure receiving surface 85a of the valve body 85 applies the downward force to the valve body 85, and the valve body 85 is moved downward and is held at the closed position, so that the first speed clutch $C_1$ is pressurized and caused to engage, providing satisfactory engine brake. If the operation of the valve body 85 becomes unsmooth due to any dust existing in the oil and the valve body 85 can not be closed by the force of the return spring 89 alone, the valve body 85 is strongly pushed by the high oil pressure in the same way as described above, and hence the oil passage 84 can be closed.

In this embodiment, the manual valve Vm has the second speed holding position II between the drive position D and the first speed holding position I and when it is shifted to this second speed holding position II, too, the oil passage 127 is communicated with the operation oil passage 29. This arrangement makes it possible to place the valve body 85 to the closed position at the second speed before applying the engine brake at the first speed, and hence, higher safety can be obtained. Moreover, the oil pressure of the operation oil passage 41a is theoretically zero at the second speed holding position II, and the force acting downwards upon the valve body 85 becomes greater. Since the second speed holding position II must be always passed through in order to shift from the drive position to the first speed holding position I, a time margin can be provided.

The embodiment described above illustrates the case in which the high pressure is applied to the creep prevention valve Vc through the manual valve Vm, but other interfaces such as other check valve(s) operative in the interlocking arrangement with the shift operation of the manual valve Vm, electricity, and the like, may be employed. Moreover, the oil passage 127 may be communicated with the oil tank R at the drive position D using other change-over valves.

As described above, since the present invention introduces the oil pressure from the oil pressure source into the creep prevention valve at the time of the engine brake, the valve body can be forcedly moved to the closed position and the engine brake can be applied reliably irrespective of various troubles such as the trouble of the electric system which detects the idling of the car so as to actuate the creep prevention valve, the unsmooth operation of the creep prevention valve due to the mixture of any dust into the oil, and so forth.

What is claimed is:

1. In a creep preventing device for vehicles equipped with an automatic transmission, comprising:
    a fluid type torque converter;
    an auxiliary transmission having a frictionally engaging element for starting and engine braking and connected to said torque converter;
    a manual change-over means capable of being manually shifted between a position allowing said frictionally engaging element to be operated at the time of starting and a position at which said frictionally engaging element is allowed to be operated during engine braking; and
    a creep preventing valve disposed in an oil passage that is branched from an operating oil passage leading to said frictionally engaging element and that leads to an oil tank, said creep preventing valve being adapted to open said oil passage during idle operation of the vehicle;
    the improvement wherein said creep preventing valve is constructed such that it is operated in opening and closing directions thereof by a common hydraulic pressure of a hydraulic pressure source acting on opposite surfaces of the valve, said opposite surfaces consisting of a first pressure receiving surface of a larger area for receiving thereon the hydraulic pressure toward a closing side of the valve and a second pressure receiving surface of a smaller area than said first pressure receiving surface for receiving thereon said hydraulic pressure toward an opening side of the valve, wherein when said manual change-over means is shifted to said position for engine braking, said creep preventing valve is placed in communication with a pressure source and is urged to a closed state by a hydraulic pressure from said source.

2. The creep preventing device of claim 1, wherein said manual change-over means further has a third position allowing engagement of another frictionally engaging element which is different from said frictionally engaging element for starting and engine braking, and wherein when said manual change-over means takes said third position, said creep preventing valve is also communicated with said hydraulic pressure source.

* * * * *